(12) United States Patent
Lee et al.

(10) Patent No.: US 10,444,480 B2
(45) Date of Patent: Oct. 15, 2019

(54) CLOAKING DEVICES CONSTRUCTED FROM PRISMS AND VEHICLES COMPRISING THE SAME

(71) Applicant: Toyota Motor Engineering & Manufacturing North America, Inc., Erlanger, KY (US)

(72) Inventors: Kyu-Tae Lee, Ann Arbor, MI (US); Debasish Banerjee, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 280 days.

(21) Appl. No.: 15/668,217

(22) Filed: Aug. 3, 2017

(65) Prior Publication Data

US 2019/0041617 A1    Feb. 7, 2019

(51) Int. Cl.
| | | |
|---|---|---|
| G02B 17/00 | (2006.01) | |
| G02B 5/04 | (2006.01) | |
| G02B 1/00 | (2006.01) | |
| G02B 27/09 | (2006.01) | |
| G02B 27/00 | (2006.01) | |
| G02B 27/12 | (2006.01) | |

(52) U.S. Cl.
CPC ........... *G02B 17/008* (2013.01); *G02B 1/007* (2013.01); *G02B 5/04* (2013.01); *G02B 27/0012* (2013.01); *G02B 27/0972* (2013.01); *G02B 27/126* (2013.01)

(58) Field of Classification Search
CPC combination set(s) only.
See application file for complete search history.

(56) References Cited

U.S. PATENT DOCUMENTS

| | | |
|---|---|---|
| 9,310,565 B2 | 4/2016 | Young et al. |
| 9,405,118 B1 | 8/2016 | Lu |

(Continued)

FOREIGN PATENT DOCUMENTS

| | | |
|---|---|---|
| CN | 103268014 B | 6/2015 |
| CN | 105340811 A | 2/2016 |

OTHER PUBLICATIONS

"Physics demonstrations: cloaking device?", Apr. 25, 2013; URL: https://skullsinthestars.com/2013/04/25/physics-demonstrations-cloaking-device.

(Continued)

*Primary Examiner* — Robert E. Tallman
(74) *Attorney, Agent, or Firm* — Dinsmore & Shohl LLP (57) ABSTRACT

A cloaking device includes an object-side, an image-side, a cloaked region and eight prisms positioned around the cloaked region. Each of the prisms has a light entrance side, a light exit side, a vertex formed from the intersection of a plane defined by the light entrance side and a plane defined by the light exit side, and a vertex angle between the light entrance side and the light exit side. A pair of first object-side prisms with inward facing vertices and a pair of second object-side prisms with outward facing vertices are positioned on the object-side, and a pair of first image-side prisms with outward facing vertices and a pair of second image-side prisms with inward facing vertices are positioned on the image-side. The light entrance sides of the pair of second object-side prisms are parallel and spaced apart from the light exit sides of the pair of first object-side prisms.

20 Claims, 7 Drawing Sheets

(56) References Cited

U.S. PATENT DOCUMENTS

| | | | |
|---|---|---|---|
| 9,588,325 B2 | 3/2017 | Robertson et al. | |
| 2015/0248013 A1* | 9/2015 | Chen | H01Q 15/08 |
| | | | 359/625 |
| 2017/0010451 A1* | 1/2017 | Naya | G02B 5/04 |

OTHER PUBLICATIONS

"Physics demonstrations: cloaking device?", published Apr. 25, 2013; URL: https://skullsinthestars.com/2013/04/25/physics-demonstrations-cloaking-device/.

Chen, Hongsheng et al., "Ray-optics cloaking devices for large objects in incoherent natural light", Nature Communications, published/accessed: Oct. 24, 2013; URL: https://www.ncbi.nlm.nih.gov/pmc/articles/PMC3826629/.

Banerjee, Debasish et al., "Invisibility cloak with image projection capability", Sci. Rep., 6: 38965 (2016).

* cited by examiner

CLOAKING DEVICES CONSTRUCTED FROM PRISMS AND VEHICLES COMPRISING THE SAME

TECHNICAL FIELD

The present specification generally relates to apparatuses and methods for making an object appear transparent and, more specifically, to cloaking devices for pillars of vehicles and vehicles comprising the same.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" through the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device includes an object-side, an image-side, a cloaked region and a plurality of prisms positioned around the cloaked region. Each of the plurality of prisms comprises a light entrance side and a light exit side that define a vertex angle there between with a vertex formed by an intersection of a plane defined by the light entrance side and a plane defined by the light exit side. The plurality of prisms include a first object-side prism with an inward facing vertex proximal to the cloaked region, a second object-side prism with an outward facing vertex distal to the cloaked region and the vertex angle of the first object-side prism is equal to the vertex angle of the second object-side prism. The plurality of prisms also include a first image-side prism with an outward facing vertex, a second image-side prism with an inward facing vertex and the vertex angle of the first image-side prism is equal to the vertex angle of the second image-side prism. The light entrance side of the first object-side prism is oriented parallel to the light exit side of the second object-side prism and the light exit side of the first object-side prism is oriented parallel to the light entrance side of the second object-side prism. Also, the light entrance side of the first image-side prism is oriented parallel to the light exit side of the second image-side prism and the light exit side of the first image-side prism is oriented parallel to the light entrance side of the second image-side prism. Light from an object positioned on the object-side of the cloaking device and obscured by the cloaked region is redirected around the cloaked region via propagation of the light through the plurality of prisms.

According to another embodiment, a cloaking device assembly includes an object-side, an image-side, a cloaked region, a cloaked article positioned within the cloaked region, and a reference optical axis extending from the object-side to the image-side. A plurality of prisms are positioned around the cloaked region. Each of the plurality of prisms comprises a light entrance side and a light exit side defining a vertex angle there between and a vertex formed from an intersection of a plane defined by the light entrance side and a plane defined by the light exit side. The plurality of prisms include a pair of first object-side prisms and a pair of second object-side prisms. Each of the pair of first object-side prisms comprises an inward facing vertex proximal to the cloaked region and each of the pair of second object-side prisms comprises an outward facing vertex distal to the cloaked region. One of the pair of first object-side prisms and one of the pair of second object-side prisms are positioned on one side of the reference optical axis and another of the pair of first object-side prisms and another of the pair of second object-side prisms are positioned on another side of the reference optical axis. The plurality of prisms also include a pair of first image-side prisms and a pair of second image-side prisms. Each of the pair of first image-side prisms comprises an outward facing vertex and each of the pair of second image-side prisms comprises an inward facing vertex. One of the pair of first image-side prisms and one of the pair of second image-side prisms are positioned on one side of the reference optical axis and another of the pair of first image-side prisms and another of the pair of second image-side prisms are positioned on another side of the reference optical axis. Each of the light exit sides of the pair of first object-side prisms is parallel to the light entrance sides of the pair of second object-side prisms and each of the light exit sides of the pair of first image-side prisms is parallel to the light entrance sides of the pair of second image-side prisms. Light from an object positioned on the object-side of the cloaking device and obscured by the cloaked region is redirected around the cloaked region via propagation of the light through the plurality of prisms.

According to another embodiment, a vehicle includes an A-pillar and a cloaking device positioned on the A-pillar. The cloaking device includes an object-side, an image-side, a cloaked region and a reference optical axis extending from the object-side to the image-side. The A-pillar is positioned in the cloaked region. The object-side is positioned on an exterior of the vehicle and the image-side is positioned within an interior of the vehicle. A plurality of prisms are positioned around the cloaked region. Each of the plurality of prisms comprises a light entrance side and a light exit side defining a vertex angle there between with a vertex formed from an intersection of a plane defined by the light entrance side and a plane defined by the light exit side. The plurality of prisms include a first object-side prism with an inward facing vertex proximal to the cloaked region, a second object-side prism with an outward facing vertex distal to the cloaked region and the vertex angle of the first object-side prism is equal to the vertex angle of the second object-side prism. The plurality of prisms also include a first image-side prism with an outward facing vertex, a second image-side prism with an inward facing vertex and the vertex angle of the first image-side prism is equal to the vertex angle of the second image-side prism. The light exit side of the first object-side prism is parallel to the light entrance side of the second object-side prism and the light exit side of the first image-side prism is parallel to the light entrance side of the second image-side prism. Light from an object positioned on the object-side of the cloaking device and pillar assembly that is cloaked and obscured by the A-pillar is redirected around the A-pillar via propagation of the light through the plurality of prisms.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a plurality of prisms positioned around a cloaked region. The cloaking devices described herein may be used to cloak vehicle articles such as a vehicle A-pillar, B-pillar, C-pillar, D-pillar, etc., and remove a "blind spot" caused by the vehicle article. A blind spot refers to a region of the vehicle where an occupant's view may be obstructed. The utilization of the prisms allows a driver to perceive an image which, if not for the cloaking device, would be obstructed by a pillar of the vehicle. Various embodiments of cloaking devices and vehicles comprising the same will be described in further detail herein with specific reference to the appended drawings.

Figure 1:
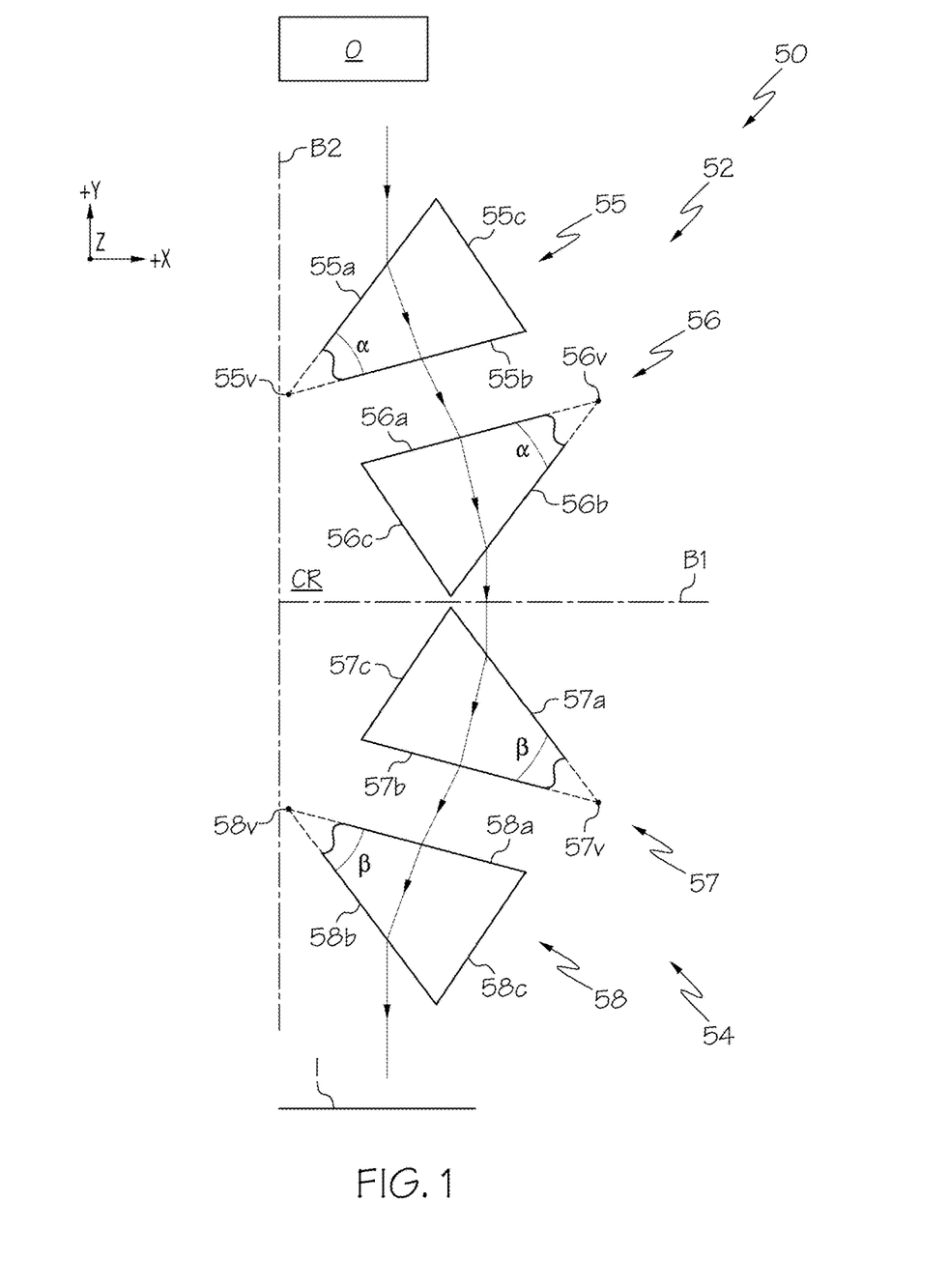
FIG. 1 schematically depicts a top view of a cloaking device according to one or more embodiments described and illustrated herein.

FIG. 1 generally depicts one embodiment of a cloaking device. The cloaking device includes an object-side, an image-side, a cloaked region, and a plurality of prisms positioned around the cloaked region. A cloaked article may be positioned within the cloaked region. Each of the plurality of prisms includes a light entrance side and a light exit side. Light from an object on the object-side of the cloaking device propagates to the image-side, and is "bent" around the cloaked region, by passing through and being refracted by the prisms. A plane defined by the light entrance side of a prism and a plane defined by the light exit side of the prism intersect at a line, herein referred to as a "vertex" of the prism. The plurality of prisms positioned around the cloaked region include a first object-side prism with an inward facing vertex, a second object-side prism with an outward facing vertex, a first image-side prism with an outward facing vertex and a second image-side prism with an inward facing vertex. Light from an object on the object-side of the cloaking device and obscured by the cloaked region from the image-side is refracted around the cloaked region and forms an image of the object on the image-side by propagating along an optical path. The optical path includes object to first object-side prism, first object-side prism to second object-side prism, second object-side prism to first image-side prism, first image-side prism to second image-side prism, second image-side prism and to image. Accordingly, an individual will see the object located on the opposite side of the cloaked region (and thus on the opposite side of a cloaked article) giving the visual impression that the cloaked article is transparent.

Still referring to FIG. 1, a cloaking assembly 50 includes four prisms 55, 56, 57, 58 positioned around a cloaked region CR. A bisecting axis B1 generally divides or designates an object-side 52 and an image-side 54 of the cloaking assembly 50. The two prisms 55, 56 are positioned on the object-side 52 of the cloaking assembly 50, i.e., above (+Y direction) the bisecting axis B1 and the two prisms 57, 58 are positioned on the image-side 54 of the cloaking assembly 50, i.e., below (−Y direction) the bisecting axis B1. Prism 55 is referred to herein as a first object-side prism 55 and prism 56 is referred to as a second object-side prism 56. Prism 57 is referred to as a first image-side prism 57 and prism 58 is referred to as a second image-side prism 58.

The first object-side prism 55 includes a light entrance side 55a and a light exit side 55b. As discussed herein, the term "light entrance side" refers to a side of a prism where light propagating from an object-side to an image-side of a cloaking assembly (−Y direction) enters the prism and the term "light exit side" refers to a side of the prism where the light exits the prism. The light entrance side 55a and light exit side 55b define a vertex angle α there between. A plane defined by the light entrance side 55a and a plane defined by the light exit side 55b intersect at line 55v extending in the Z-direction (also referred to herein as a "vertex"). In embodiments, the light entrance side 55a and light exit side 55b intersect at the vertex 55v. In other embodiments, the prism 55 is a truncated prism such that the light entrance side 55a and light exit side 55b do not extend to and do not intersect at the vertex 55v as depicted in FIG. 1. The light entrance side 55a and light exit side 55b extend from the vertex 55v and intersect with a base 55c. In embodiments, prism 55 is an isosceles prism and the length of the light entrance side 55a from the vertex 55v to the base 55c is equal to the length of the light exit side 55b from the vertex 55v to the base 55c. In such embodiments, prism 55 may be an equilateral prism and the lengths of the light entrance side 55a, the light exit side 55b and the base 55c are equal. In other embodiments, the prism 55 is not an isosceles prism and the length of the light entrance side 55a from the vertex 55v to the base 55c is not equal to the length of the light exit side 55b from the vertex 55v to the base 55c.

The second object-side prism 56 includes a light entrance side 56a and a light exit side 56b. The light entrance side 56a and light exit side 56b define the angle α there between. That is, the second object-side prism 56 has the same vertex angle α as the first object-side prism 55. A plane defined by the light entrance side 56a and a plane defined by the light exit side 56b intersect at vertex 56v extending in the Z-direction. In embodiments, the light entrance side 56a and light exit side 56b intersect at the vertex 56v. In other embodiments, the prism 56 is a truncated prism such that the light entrance side 56a and light exit side 56b do not extend to and do not intersect at the vertex 56v as depicted in FIG. 1. The light entrance side 56a and light exit side 56b extend from the vertex 56v and intersect with a base 56c. In embodiments, prism 56 is an isosceles prism and the length of the light entrance side 56a from the vertex 56v to the base 56c is equal to the length of the light exit side 56b from the vertex 56v to the base 56c. In such embodiments, prism 56 may be an equilateral prism and the lengths of the light entrance side 56a, the light exit side 56b and the base 56c are equal. In other embodiments, the prism 56 is not an isosceles prism and the length of the light entrance side 56a from the vertex 56v to the base 56c is not equal to the length of the light exit side 56b from the vertex 56v to the base 56c.

The first image-side prism 57 includes a light entrance side 57a and a light exit side 57b. The light entrance side 57a and light exit side 57b define a vertex angle θ there between. A plane defined by the light entrance side 57a and a plane defined by the light exit side 57b intersect at vertex 57v extending in the Z-direction. In embodiments, the light entrance side 57a and light exit side 57b intersect at the vertex 57v. In other embodiments, the prism 57 is a truncated prism such that the light entrance side 57a and light exit side 57b do not extend to and do not intersect at the vertex 57v as depicted in FIG. 1. In embodiments, prism 57 is an isosceles prism and the length of the light entrance side 57a from the vertex 57v to the base 57c is equal to the length of the light exit side 57b from the vertex 57v to the base 57c. In such embodiments, prism 57 may be an equilateral prism and the lengths of the light entrance side 57a, the light exit side 57b and the base 57c are equal. In other embodiments, the prism 57 is not an isosceles prism and the length of the light entrance side 57a from the vertex 57v to the base 57c is not equal to the length of the light exit side 57b from the vertex 57v to the base 57c.

The second image-side prism 58 includes a light entrance side 58a and a light exit side 58b. The light entrance side 58a and light exit side 58b define the vertex angle θ there between. That is, the second image-side prism 58 has the same vertex angle θ as the first image-side prism 57. A plane defined by the light entrance side 58a and a plane defined by the light exit side 58b intersect at vertex 58v extending in the Z-direction. In embodiments, the light entrance side 58a and light exit side 58b intersect at the vertex 58v. In other embodiments, the prism 58 is a truncated prism such that the light entrance side 58a and light exit side 58b do not extend to and do not intersect at the vertex 58v as depicted in FIG. 1. The light entrance side 58a and light exit side 58b extend from the vertex 58v and intersect with a base 58c. In embodiments, prism 58 is an isosceles prism and the length of the light entrance side 58a from the vertex 58v to the base 58c is equal to the length of the light exit side 58b from the vertex 58v to the base 58c. In such embodiments, prism 58 may be an equilateral prism and the lengths of the light entrance side 58a, the light exit side 58b and the base 58c are equal. In other embodiments, the prism 58 is not an isosceles prism and the length of the light entrance side 58a from the vertex 58v to the base 58c is not equal to the length of the light exit side 58b from the vertex 58v to the base 58c.

Still referring to FIG. 1, the prisms 55 and 56 are positioned and oriented relative to the cloaked region CR such that vertex 55v is an inward facing vertex and vertex 56v is outward facing vertex. As described herein the term "inward facing vertex" refers to a vertex of a prism that is positioned proximal and/or adjacent to the cloaked region CR as depicted by vertex 55v and the term "outward facing vertex" refers to a vertex of a prism that is positioned distal from the cloaked region as depicted by vertex 56v. The prisms 57 and 58 are positioned and oriented relative to the cloak region CR such that vertex 57v is outward facing (outward facing vertex 57v) and vertex 58v is inward facing (inward facing vertex 58v).

In embodiments, the light entrance side 55a and the light exit side 55b of the first object-side prism 55 are parallel to the light exit side 56b and the light entrance side 56a, respectively, of the second-object-side prism 56. Also, the light entrance side 57a and light exit side 57b of the first image-side prism 57 are parallel to the light exit side 58b and light entrance side 58a, respectively, of the second image-side prism 58. Accordingly, adjacent sides (i.e., sides 55b, 56a) and opposite sides (i.e., sides 55a, 56b) of the first and second object-side prisms 55, 56 are parallel to each other, and adjacent sides (i.e., sides 57b, 58a) and opposite sides (i.e., sides 57a, 58b) of the first and second image-side prisms 57, 58 are parallel to each other.

As depicted in FIG. 1, light 'L' traveling in the −Y direction from an object 'O' on the object-side 52 to form an image 'I' on the image-side 54 of the cloaking assembly 50 is refracted around the cloaked region CR via propagation through the first object-side prism 55, second object-side prism 56, first image-side prism 57 and second image-side prism 58. Particularly, light L from the object 'O' is incident on the light entrance side 55a of the first object-side prism 55, propagates through the light entrance side 55a and is refracted within the first object-side prism 55 to the light exit side 55b. Light L exits the first object-side prism 55 via the light exit side 55b, propagates to the parallel light entrance side 56a and is refracted within the second object-side prism 56 to the light exit side 56b. Light L exits the second object-side prism 56 via the light exit side 56b, propagates to the light entrance side 57a and is refracted within the first image-side prism 57 to the light exit side 57b. Light L exits the first image-side prism 57 via the light exit side 57b, propagates to the light entrance side 58a and is refracted within the second image-side prism 58 to the light exit side 58b. Light L exits the second image-side prism 58 via light exit side 58b and propagates on its original path to form an image of the object O on the image-side 54 of the cloaking assembly 50. Accordingly, light from the object O may travel from the object-side 52 to the image-side 54 via the optical path object: O—first object-side prism 55—second object-side prism 56—first image-side prism 57—second image-side prism 58—image I.

It should be understood that the cloaking assembly 50 may include object-side prisms and image-side prisms positioned on another side (−X direction) of an optical reference axis B2 depicted in FIG. 1 as discussed in more detail below with reference to FIGS. 2 and 3.

Figure 2:
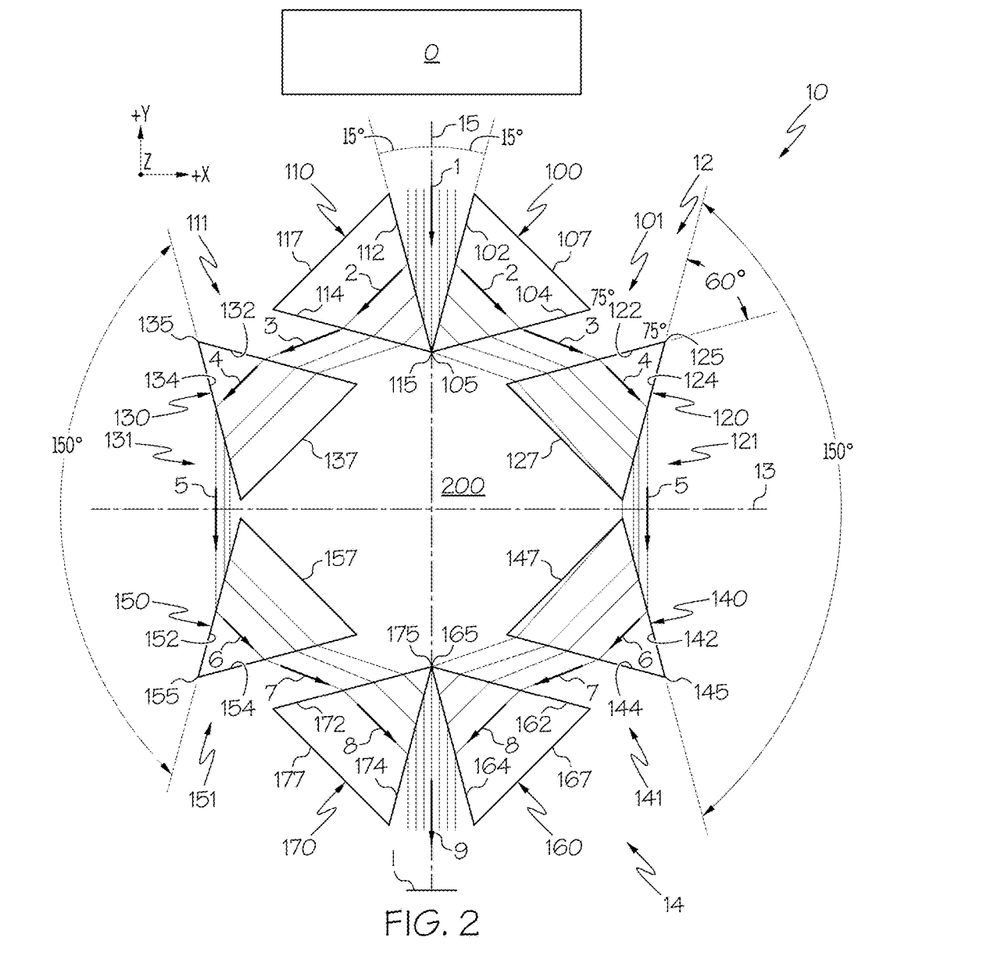
FIG. 2 schematically depicts a top view of a cloaking device according to one or more embodiments described and illustrated herein.

Referring now to FIG. 2, embodiments of a cloaking assembly with prisms comprising light entrance sides, light exit sides and bases having the same length are depicted. Particularly, FIG. 2 depicts a cloaking assembly 10 with eight equilateral prisms 100, 110, 120, 130, 140, 150, 160, 170 positioned around a cloaked region CR. The four equilateral prisms 100, 110, 120, 130 are positioned on one side, i.e., an object-side 12 of a bisecting axis 13 and the four equilateral prisms 140, 150, 160, 170 are positioned on another side, i.e., an image-side 14 of the bisecting axis 13. The four equilateral prisms 100, 120, 140, 160 are positioned on a right hand side (+X direction) of a reference optical axis 15 and the four equilateral prisms 110, 130, 150, 170 are positioned on a left hand side (−X direction) of the reference side 15. As discussed herein, the eight equilateral prisms 100, 110, 120, 130, 140, 150, 160, 170 may be referred to as: a first object-side equilateral prism 100; a first object-side equilateral prism 110; a second object-side equilateral prism 120; a second object-side equilateral prism 130; a first image-side equilateral prism 140; a first image-side equilateral prism 150; a second image-side equilateral prism 160; and a second image-side equilateral prism 170. Accordingly, the eight equilateral prisms 100, 110, 120, 130, 140, 150, 160, 170 may be arranged around the cloaked region CR as a pair of first object-side equilateral prisms 100, 110, a pair of second object-side equilateral prisms 120, 130, a pair of first image-side equilateral prisms 140, 150, and a pair of second image-side equilateral prisms 160, 170.

Referring to the four equilateral prisms 100, 120, 140, 160 positioned on the right hand side (+X direction) of the reference optical axis 15, the first object-side equilateral prism 100 includes a light entrance side 102 and a light exit side 104. The light entrance side 102 and light exit side 104 intersect at an inward facing vertex 105 and a base 107 extending between the light entrance side 102 and light exit side 104. The second object-side equilateral prism 120 includes a light entrance side 122 and a light exit side 124. The light entrance side 122 and light exit side 124 intersect at an outward facing vertex 125 and a base 127 extending between the light entrance side 122 and light exit side 124. The first image-side equilateral prism 140 includes a light entrance side 142 and a light exit side 144. The light entrance side 142 and light exit side 144 intersect at an outward facing vertex 145 and a base 147 extending between the light entrance side 142 and light exit side 144. The second image-side equilateral prism 160 includes a light entrance side 162 and a light exit side 164. The light entrance side 162 and light exit side 164 intersect at an inward facing vertex 165 and a base 167 extending between the light entrance side 162 and light exit side 164.

In embodiments, the light entrance side 102 of the first object-side equilateral prism 100 is oriented at an angle of 15° (clockwise (CW)) relative to the reference optical axis 15. The second object-side equilateral prism 120 may be spaced apart from the first object-side equilateral prism 100 such that a first air gap 101 is between the light exit side 104 of the first object-side equilateral prism 100 and the light entrance side 122 of the second object-side equilateral prism 120. As used herein, the term "air gap" refers to a physical space between adjacent prism sides occupied by a gas (e.g., air). In the alternative, a transparent medium, e.g., glass, can be positioned between the light exit side 104 of the first object-side equilateral prism 100 and the light entrance side 122 of the second object-side equilateral prism 120. The light entrance side 102 and the light exit side 104 of the first object-side equilateral prism are parallel to the light exit side 124 and the light entrance side 122, respectively, of the second object-side equilateral prism 120. Accordingly, the second object-side equilateral prism 120 is oriented 180° relative to the first object-side equilateral prism 100.

The light entrance side 142 of the first image-side equilateral prism 140 is spaced apart from the light exit side 124 of the second object-side equilateral prism 120 and a second air gap 121 may be present there between. In the alternative, a transparent medium glass, can be positioned between the light exit side 124 of the second object-side equilateral prism 120 and the light entrance side 142 of the first image-side equilateral prism 140. In embodiments, the first image-side equilateral prism 140 is oriented 150° (CW) from the second object-side equilateral prism 120. The second image-side equilateral prism 160 may be spaced apart from the first image-side equilateral prism 140 such that a third air gap 141 is between the light exit side 144 of the first image-side equilateral prism 140 and the light entrance side 162 of the second image-side equilateral prism 160. In the alternative, a transparent medium can be positioned between the light exit side 144 of the first image-side equilateral prism 140 and the light entrance side 162 of the second image-side equilateral prism 160. The light entrance side 142 and the light exit side 144 of the first image-side equilateral prism 140 are parallel to the light exit side 164 and the light entrance side 162, respectively, of the second image-side equilateral prism 160. Accordingly, the second image-side equilateral prism 160 is oriented 180° relative to the first image-side equilateral prism 140.

Light from the object 'O' travels from the object-side 12 around the cloaked region CR and forms an image 'I' on the image-side 14 via propagation between and refraction within the equilateral prisms 100, 120, 140, 160. Particularly, light 1 travels from the object O and is incident on the light entrance side 102 of the first object-side equilateral prism 100, propagates through the light entrance side 102 and is refracted within the first object-side equilateral prism 100 to the light exit side 104. Light 2 exits the first object-side equilateral prism 100 via the light exit side 104, propagates to the light entrance side 122 and is refracted within the second object-side equilateral prism 120 to the light exit side 124. Light 4 exits the second object-side equilateral prism 120 via the light exit side 124, propagates to the light entrance side 142 and is refracted within the first image-side equilateral prism 140 to the light exit side 144. Light 6 exits the first image-side equilateral prism 140 via the light exit side 144, propagates to the light entrance side 162 and is refracted within the second image-side equilateral prism 160 to the light exit side 164. Light 8 exits the second image-side equilateral prism 160 via the light exit side 164 and propagates parallel to light 1 to form the image I of the object O on the image-side 14 of the cloaking assembly 10. Accordingly, light from the object O may travel from the object-side 12 to the image-side 14 via the optical path: object O—first object-side equilateral prism 100—second object-side equilateral prism 120—first image-side equilateral prism 140—second image-side equilateral prism 160—image I.

It should be understood that the cloaking assembly 10 may cloak an object within the cloaked region CR including only the four equilateral prisms 100, 120, 140, 160. That is, an object positioned on the right hand side (+X direction) of the reference optical axis 15 within the cloaked region CR would be cloaked by the four equilateral prisms 100, 120, 140, 160. In the alternative, the cloaking assembly 10 may additionally include the four equilateral prisms 110, 130, 150, 170 on the left hand side (−X direction) of the reference optical axis 15. In this embodiment, the cloaking assembly is symmetrical about the reference optical axis 15. Particularly, the first object-side equilateral prism 110 includes a light entrance side 112 and a light exit side 114. The light entrance side 112 and light exit side 114 intersect at an inward facing vertex 115 and a base 117 extending between the light entrance side 112 and the light exit side 114. The second object-side equilateral prism 130 includes a light entrance side 132 and a light exit side 134. The light entrance side 132 and the light exit side 134 intersect at an outward facing vertex 135 and a base 137 extending between the light entrance side 132 and the light exit side 134. The first image-side equilateral prism 150 includes a light entrance side 152 and a light exit side 154. The light entrance side 152 and the light exit side 154 intersect at an outward facing vertex 155 and a base 157 extending between the light entrance side 152 and the light exit side 154. The second image-side equilateral prism 170 includes a light entrance side 172 and a light exit side 174. The light entrance side 172 and the light exit side 174 intersect at an inward facing vertex 175 and a base 177 extending between the light entrance side 172 and the light exit side 174.

In embodiments, the light entrance side 112 of the first object-side equilateral prism 110 is inclined 15° (counter clockwise (CCW)) from the reference optical axis 15. The second object-side equilateral prism 130 may be spaced apart from the first object-side equilateral prism 110 such that a first air gap 111 is between the light exit side 114 of the first object-side equilateral prism 110 and the light entrance side 132 of the second object-side equilateral prism 130. In the alternative, a transparent medium can be positioned between the light exit side 114 of the first object-side equilateral prism 110 and the light entrance side 132 of the second object-side equilateral prism 130. The light entrance side 112 and the light exit side 114 of the first object-side equilateral prism 110 are parallel to the light exit side 134 and the light entrance side 132, respectively, of the second object-side equilateral prism 130. Accordingly, the second object-side equilateral prism 130 is oriented 180° relative to the first object-side equilateral prism 110.

The light entrance side 152 of the first image-side equilateral prism 150 is spaced apart from the light exit side 134 of the second object-side equilateral prism 130 and a second air gap 131 may be present there between. In the alternative, a transparent medium can be positioned between the light exit side 134 of the second object-side equilateral prism 130 and the light entrance side 152 of the first image-side equilateral prism 150. In embodiments, the first image-side equilateral prism 150 is oriented 150° (CCW) from the second object-side equilateral prism 130. The second image-side equilateral prism 170 may be spaced apart from the first image-side equilateral prism 150 such that a third air gap 151 is between the light exit side 154 of the first image-side equilateral prism 150 and the light entrance side 172 of the second image-side equilateral prism 170. In the alternative, a transparent medium can be positioned between the light exit side 154 of the first image-side equilateral prism 150 and the light entrance side 172 of the second image-side equilateral prism 170. The light entrance side 152 and the light exit side 154 of the first image-side equilateral prism 150 are parallel to the light exit side 174 and the light entrance side 172, respectively, of the second image-side equilateral prism 170. Accordingly, the second image-side equilateral prism 170 is oriented 180° relative to the first image-side equilateral prism 150.

Light from the object 'O' travels from the object-side 12 around the cloaked region CR and forms an image 'I' on the image-side 14 via propagation between and refraction within the equilateral prisms 110, 130, 150, 170. Particularly, light 1 from the object O is incident on light entrance side 112 of the first object-side equilateral prism 110, propagates through the light entrance side 112 and is refracted within the first object-side equilateral prism 110 to the light exit side 114. Light 2 exits the first object-side equilateral prism 110 via the light exit side 114, propagates to the light entrance side 132 and is refracted within the second object-side equilateral prism 130 to the light exit side 134. Light 4 exits the second object-side equilateral prism 130 via the light exit side 134, propagates to the light entrance side 152 and is refracted within the first image-side equilateral prism 150 to the light exit side 154. Light 6 exits the first image-side equilateral prism 150 via the light exit side 154, propagates to the light entrance side 172 and is refracted within the second image-side equilateral prism 170 to the light exit side 174. Light 8 exits the second image-side equilateral prism 170 via the light exit side 174 and propagates on parallel to light 1 to form the image I of the object O on the image-side 14 of the cloaking assembly 10. Accordingly, light from the object O may travel from the object-side 12 to the image-side 14 via the optical path: O—first object-side equilateral prism 110 —second object-side equilateral prism 130—first image-side equilateral prism 150—second image-side equilateral prism 170—image I.

Figure 3:
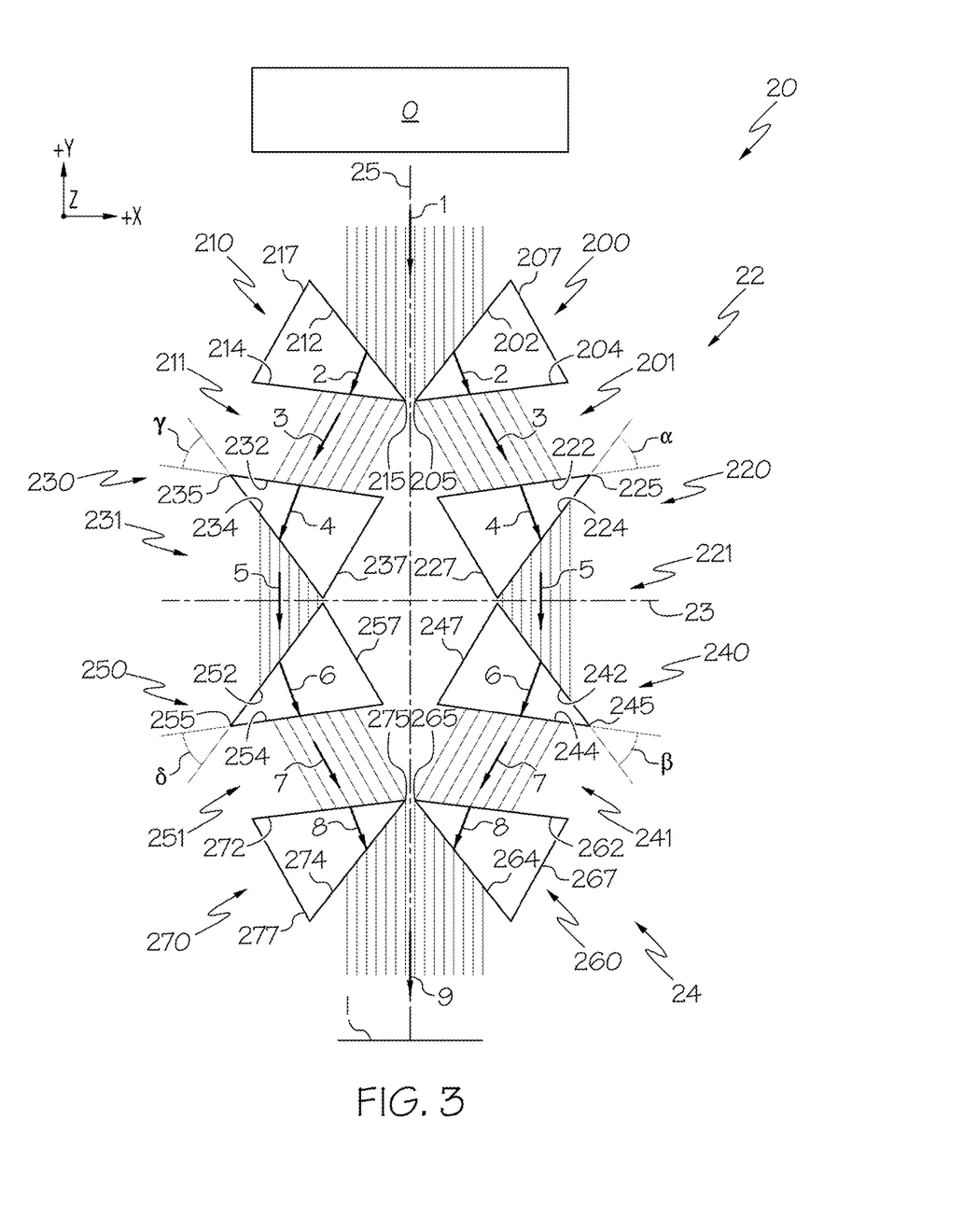
FIG. 3 schematically depicts a top view of a cloaking device according to one or more embodiments described and illustrated herein.

Referring now to FIG. 3, embodiments of a cloaking assembly with prisms comprising light entrance sides and light exit sides having the same length are depicted. Particularly, FIG. 3 depicts a cloaking assembly 20 with eight isosceles prisms 200, 210, 220, 230, 240, 250, 260, 270 positioned around a cloaked region CR. A bisecting axis 23 generally divides an object-side 22 from an image-side 24 of the cloaking assembly 20. The four isosceles prisms 200, 210, 220, 230 are positioned on one side, i.e., the object-side 22 of the bisecting axis 23 and the four isosceles prisms 240, 250, 260, 270 are positioned on another side, i.e., the image-side 24 of the bisecting axis 23. The four isosceles prisms 200, 220, 240, 260 are positioned on a right hand side (+X direction) of a reference optical axis 25 and the four isosceles prisms 210, 230, 250, 270 are positioned on a left hand side (−X direction) of the reference side 25. As discussed herein, the eight isosceles prisms 200, 210, 220, 230, 240, 250, 260, 270 are referred to as: a first object-side isosceles prism 200; a first object-side isosceles prism 210; a second object-side isosceles prism 220; a second object-side isosceles prism 230; a first image-side isosceles prism 240; a first image-side isosceles prism 250; a second image-side isosceles prism 260; and a second image-side isosceles prism 270. Accordingly, the eight isosceles prisms 200, 210, 220, 230, 240, 250, 260, 270 may be arranged around the cloaked region CR as a pair of first object-side isosceles prisms 200, 210, a pair of second object-side isosceles prisms 220, 230, a pair of first image-side isosceles prisms 240, 250, and a pair of second image-side isosceles prisms 260, 270.

The first object-side isosceles prism 200 includes a light entrance side 202 and a light exit side 204. The light entrance side 202 and the light exit side 204 define a vertex angle α there between and intersect at an inward facing vertex 205 and with a base 207 extending between the light entrance side 202 and the light exit side 204. The second object-side isosceles prism 220 includes a light entrance side 222 and a light exit side 224. The light entrance side 222 and the light exit side 224 define the vertex angle α there between and intersect at an outward facing vertex 225 and with a base 227 extending between the light entrance side 222 and the light exit side 224. Accordingly, the second object-side isosceles prism 220 has the same vertex angle α as the first object-side isosceles prism 200.

The first image-side isosceles prism 240 includes a light entrance side 242 and a light exit side 244. The light entrance side 242 and light exit side 244 define a vertex angle β there between and intersect at an outward facing vertex 245 and with a base 247 extending between the light entrance side 242 and the light exit side 244. The second image-side isosceles prism 260 includes a light entrance side 262 and a light exit side 264. The light entrance side 262 and the light exit side 264 define the vertex angle β there between and intersect at an inward facing vertex 265 and with a base 267 extending between the light entrance side 262 and the light exit side 264. Accordingly, the second image-side isosceles prism 260 has the same vertex angle β as the first image-side isosceles prism 240. In embodiments, the vertex angle β of the first and second image-side isosceles prisms 240, 260 is equal to the vertex angle α of the first and second object-side isosceles prisms 200, 220. In other embodiments, the vertex angle β of the first and second image-side isosceles prisms 240, 260 is not equal to the vertex angle α of the first and second object-side isosceles prisms 200, 220.

The light entrance side 202 and the light exit side 204 of the first object-side isosceles prism 200 are parallel to the light exit side 224 and the light entrance side 222, respectively, of the second object-side isosceles prism 220. Accordingly, the second object-side isosceles prism 220 is oriented 180° relative to the first object-side isosceles prism 200. In embodiments, the second object-side isosceles prism 220 may be spaced apart from the first object-side isosceles prism 200 such that a first air gap 201 is between the light exit side 204 of the first object-side isosceles prism 200 and the light entrance side 222 of the second object-side isosceles prism 220. In the alternative, a transparent medium can be positioned between the light exit side 204 of the first object-side isosceles prism 200 and the light entrance side 222 of the second object-side isosceles prism 220.

The light entrance side 242 of the first image-side isosceles prism 240 is spaced apart from the light exit side 224 of the second object-side isosceles prism 220 and a second air gap 221 may be present there between. In the alternative, a transparent medium can be positioned between the light exit side 224 of the second object-side isosceles prism 220 and the light entrance side 242 of the first image-side isosceles prism 240. The light entrance side 242 and light exit side 244 of the first image-side isosceles prism 240 are parallel to the light exit side 264 and light entrance side 262, respectively, of the second image-side isosceles prism 260. Accordingly, the second image-side isosceles prism 260 is oriented 180° relative to the first image-side isosceles prism 240. In embodiments, the second image-side isosceles prism 260 may be spaced apart from the first image-side isosceles prism 240 such that a third air gap 241 is positioned between the light exit side 244 of the first image-side isosceles prism 240 and the light entrance side 262 of the second image-side isosceles prism 260. In the alternative, a transparent medium can be positioned between the light exit side 244 of the first image-side isosceles prism 240 and the light entrance side 262 of the second image-side isosceles prism 260.

Light from the object 'O' travels from the object-side 22 of the cloaking assembly 20 around the cloaked region CR and forms an image 'I' on the image-side 24 via propagation between and refraction within the isosceles prisms 200, 220, 240, 260. Particularly, light 1 from the object O is incident on the light entrance side 202 of the first object-side isosceles prism 200, propagates as light 2 through the light entrance side 202 and is refracted within the first object-side isosceles prism 200 to the light exit side 204. Light 2 exits the first object-side isosceles prism 200 as light 3 via the light exit side 204, propagates to the parallel light entrance side 222 and is refracted as light 4 within the second object-side isosceles prism 220 to the light exit side 224. Light 4 exits the second object-side isosceles prism 220 as light 5 via the light exit side 224, propagates to the light entrance side 242 and is refracted as light 6 within the first image-side isosceles prism 240 to the light exit side 244. Light 6 exits the first image-side isosceles prism 240 as light 7 via the light exit side 244, propagates to the light entrance side 262 and is refracted within the second image-side isosceles prism 260 as light 8 to the light exit side 264. Light 8 exits the second image-side isosceles prism 260 as light 9 via light exit side 264 and propagates parallel to light 1 to form the image I of the object O on the image-side 24 of the cloaking assembly 20. Accordingly, light from the object O may travel from the object-side 22 to the image-side 24 via the optical path: O—first object-side isosceles prism 200—second object-side isosceles prism 220—first image-side isosceles prism 240—second image-side isosceles prism 260—image I.

It should be understood that the cloaking assembly 20 may cloak an object within the cloaked region CR including only the four isosceles prisms 200, 220, 240, 260. That is, an object positioned on the right hand side (+X direction) of the reference optical axis 25 within the cloaked region CR would be cloaked by the four isosceles prisms 200, 220, 240, 260. In the alternative, the cloaking assembly 20 may include the four isosceles prisms 210, 230, 250, 270 on the left hand side (−X direction) of the reference optical axis 25. In this embodiment, the cloaking assembly is symmetrical about the reference optical axis 25. Particularly, the first object-side isosceles prism 210 includes a light entrance side 212 and a light exit side 214. The light entrance side 212 and light exit side 214 define a vertex angle γ there between and intersect at an inward facing vertex 215 and with a base 217 extending between the entrance side 212 and light exit side 214. The second object-side isosceles prism 230 includes a light entrance side 232 and a light exit side 234. The light entrance side 232 and the light exit side 234 define the vertex angle γ there between and intersect at an outward facing vertex 235 and with a base 237 extending between the light entrance side 232 and the light exit side 234. Accordingly, the second object-side isosceles prism 230 has the same vertex angle γ as the first object-side isosceles prism 210.

The first image-side isosceles prism 250 includes a light entrance side 252 and a light exit side 254. The light entrance side 252 and the light exit side 254 define a vertex angle δ there between and intersect at an outward facing vertex 255 and with a base 257 extending between the light entrance side 252 and the light exit side 254. The second image-side isosceles prism 270 includes a light entrance side 272 and a light exit side 274. The light entrance side 272 and the light exit side 274 define the vertex angle δ there between and intersect at an inward facing vertex 275 and a base 277 extending between the light entrance side 272 and the light exit side 274.

In embodiments, the vertex angle δ of the first and second image-side isosceles prisms 250, 270 is the equal to the vertex angle γ of the first and second object-side isosceles prisms 210, 230. In such embodiments, the vertex angles δ, γ may be equal to the vertex angle α of the first and second object-side isosceles prisms 200, 220 and/or the vertex angle β of the first and second image-side isosceles prisms 240, 260 (δ=γ=α; δ=γ=β; δ=γ=α=β). In other embodiments, the vertex angle δ of the first and second image-side isosceles prisms 250, 270 is the not equal to the vertex angle γ of the first and second object-side isosceles prisms 210, 230. In such embodiments, the vertex angles δ, γ may not be equal to the vertex angle α of the first and second object-side isosceles prisms 200, 220 and/or the vertex angle β of the first and second image-side isosceles prisms 240, 260 (δ≠γ≠α≠β).

The light entrance side 212 and the light exit side 214 of the first object-side isosceles prism 210 are parallel to the light exit side 234 and the light entrance side 232, respectively, of the second object-side isosceles prism 230. Accordingly, the second object-side isosceles prism 230 is oriented 180° relative to the first object-side isosceles prism 210. In embodiments, the second object-side isosceles prism 230 may be spaced apart from the first object-side isosceles prism 210 such that a first air gap 211 is between the light exit side 214 of the first object-side isosceles prism 210 and the light entrance side 232 of the second object-side isosceles prism 230. In the alternative, a transparent medium can be positioned between the light exit side 214 of the first object-side isosceles prism 210 and the light entrance side 232 of the second object-side isosceles prism 230.

The light entrance side 252 of the first image-side isosceles prism 250 is spaced apart from the light exit side 234 of the second object-side isosceles prism 230 and a second air gap 231 may be present there between. In the alternative, a transparent medium can be positioned between the light exit side 234 of the second object-side isosceles prism 230 and the light entrance side 252 of the first image-side isosceles prism 250. The light entrance side 252 and light exit side 254 of the first image-side isosceles prism 250 are parallel to the light exit side 274 and light entrance side 272, respectively, of the second image-side isosceles prism 270. Accordingly, the second image-side isosceles prism 270 is oriented 180° relative to the first image-side isosceles prism 250. In embodiments, the second image-side isosceles prism 270 may be spaced apart from the first image-side isosceles prism 250 such that a third air gap 251 is between the light exit side 254 of the first image-side isosceles prism 250 and the light entrance side 272 of the second image-side isosceles prism 270. In the alternative, a transparent medium can be between the light exit side 254 of the first image-side isosceles prism 250 and the light entrance side 272 of the second image-side isosceles prism 270.

Light from the object 'O' travels from the object-side 22 of the cloaking assembly 20 around the cloaked region CR and forms an image 'I' on the image-side 24 via propagation between and refraction within the isosceles prisms 210, 230, 250, 270. Particularly, light 1 from the object O is incident on light entrance side 212 of the first object-side isosceles prism 210, propagates through the light entrance side 212 and is refracted as light 2 within the first object-side isosceles prism 210 to the light exit side 214. Light 2 exits the first object-side isosceles prism 210 as light 3 via the light exit side 214, propagates to the light entrance side 232 and is refracted within the second object-side isosceles prism 230 as light 4 to the light exit side 234. Light 4 exits the second object-side isosceles prism 230 as light 5 via the light exit side 234, propagates to the light entrance side 252 and is refracted within the first image-side isosceles prism 250 as light 6 to the light exit side 254. Light 6 exits the first image-side isosceles prism 250 as light 7 via the light exit side 254, propagates to the light entrance side 272 and is refracted within the second image-side isosceles prism 270 as light 8 to the light exit side 274. Light 8 exits the second image-side isosceles prism 270 as light 9 via the light exit side 274 and propagates parallel to light 1 to form the image I of the object O on the image-side 24 of the cloaking assembly 20. Accordingly, light from the object O may travel from the object-side 22 to the image-side 24 via the optical path: O—first object-side isosceles prism 210—second object-side isosceles prism 230—first image-side isosceles prism 250—second image-side isosceles prism 270—image I.

Figure 4:
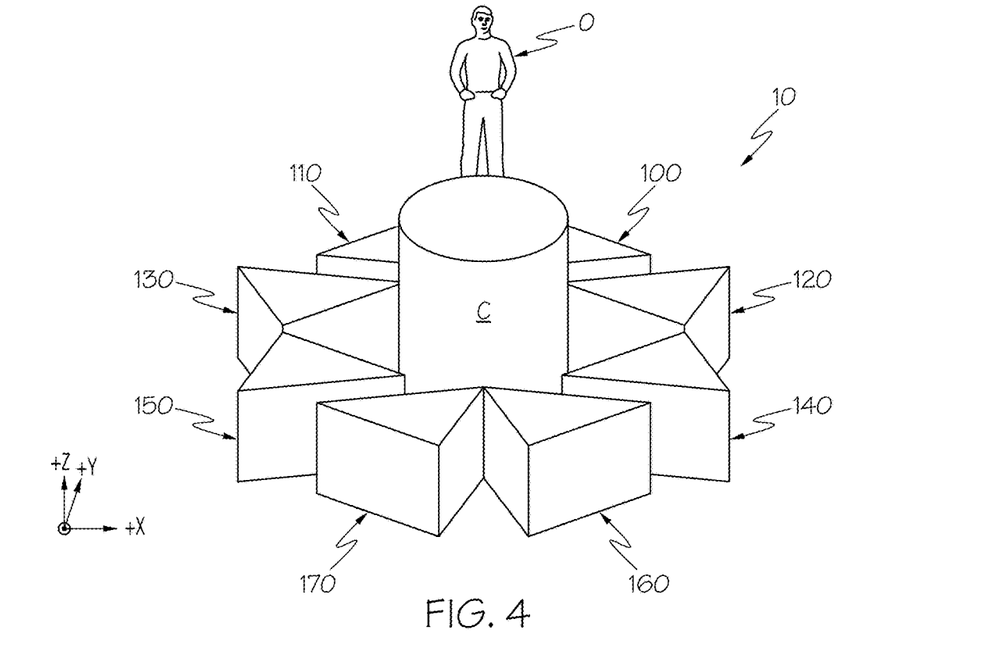
FIG. 4 schematically depicts a top perspective view of the cloaking device of FIG. 2 with a first object on one side of the cloaking device and a second object within a cloaked region of the cloaking device.
Figure 5:
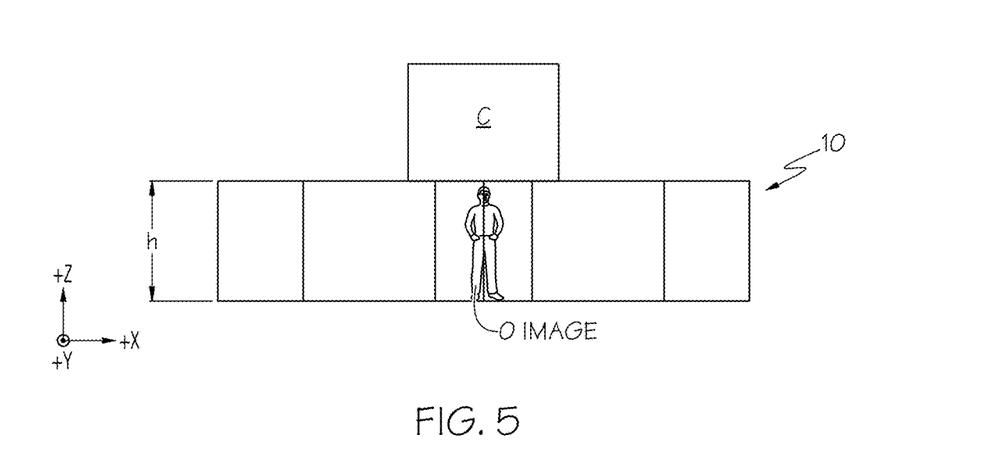
FIG. 5 schematically depicts a side view of the cloaking device of FIG. 4 with the first object on one side of the cloaking device and the second object within the cloaked region of the cloaking device.

Referring now to FIGS. 2, 4 and 5, a top perspective view and a side view of a cloaking device according to embodiments described herein are shown in FIGS. 4 and 5, respectively. Specifically, FIG. 4 is a top perspective view of an article in the form of a column 'C' within the cloaked region CR of the cloaking assembly 10 (FIG. 2) and an object 'O' (e.g., a person) located behind the column C on the object-side 12 of the cloaking assembly 10 in the +Y direction. The column C has a height dimension in the Z direction (increasing height in the +Z direction) greater than the height h of the cloaking device. FIG. 5 is a side view from the +Y direction of the cloaking assembly 10 shown in FIG. 4 and shows the portion of the column C that is within the cloaked region CR is not visible and the object O located behind the column C in the +Y direction is visible to an observer viewing the cloaking assembly 10 in the +Y direction. Accordingly, the column C positioned within the cloaked region CR is not visible to an observer viewing the image-side 14 of the cloaking assembly 10 and an image of the object O is visible to the observer viewing the image-side 14. Although column C in FIGS. 4-5 is separate from the bases 127, 137, 147, 157, i.e., column C is a separate object from the cloaking assembly 10, it should be appreciated that column C may be structurally part of the cloaking assembly 10 and have an outer surface that provides or is equivalent to bases 127, 137, 147, 157.

Figure 6:
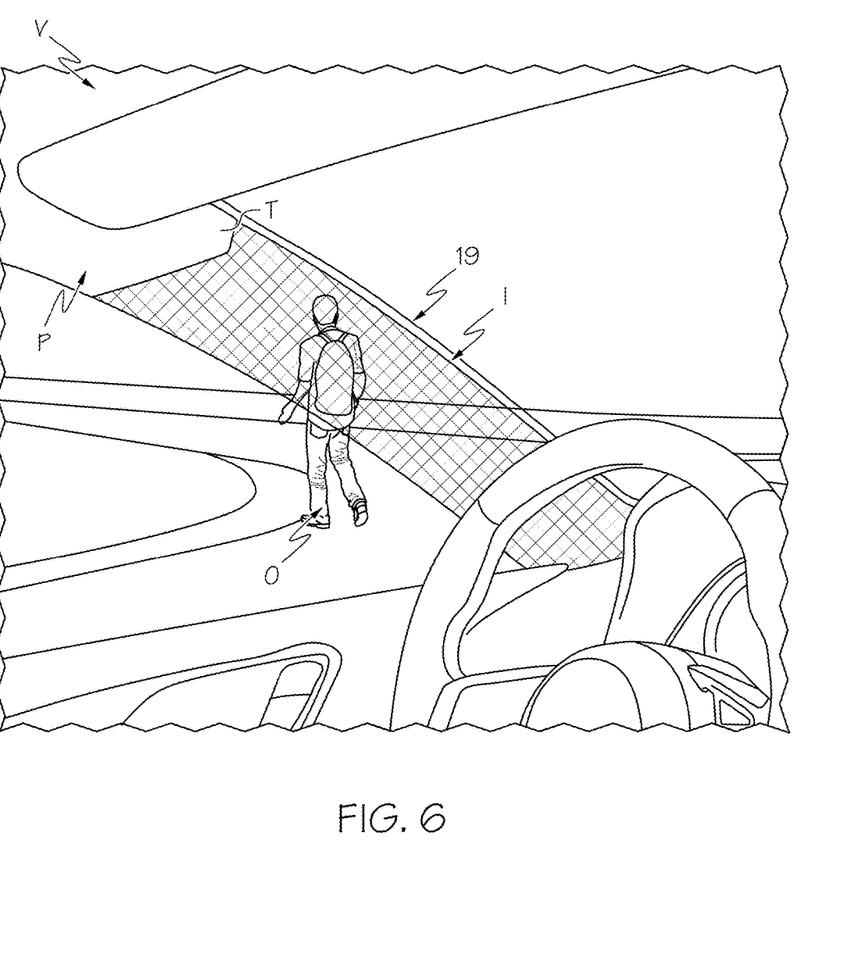
FIG. 6 schematically depicts a side view of a cloaking device cloaking an A-pillar of a vehicle according to one or more embodiments described and illustrated herein.

Referring to FIGS. 1-6, embodiments of an A-pillar of a vehicle being cloaked by a cloaking device are shown. Particularly, FIG. 6 shows a cloaking device 19 cloaking a portion of an A-pillar P of a vehicle V. A portion of the A-pillar P is positioned within a cloaked region (not shown) of the cloaking device 19 and a portion of the A-pillar P extends beyond the cloaking device and is covered with trim T. Illustrated outside of the vehicle V is a target object O in the form of pedestrian. A portion of the pedestrian O is visible through a side window of the vehicle V and a portion of the pedestrian is visible "through" the A-pillar P cloaked by the cloaking device 19. The cloaking device 19 redirects light reflected from the pedestrian O around the A-pillar P positioned within the cloaked region of the cloaking device 19 and forms an image I of the pedestrian O on an image-side of the cloaking device 19 that is visible to an occupant of the vehicle V looking towards the pedestrian O. Accordingly, light from the pedestrian O appears to pass through the A-pillar P and a blind spot typically created by the A-pillar P is not as present as when the portion of the A-pillar P is not positioned within the cloaked region of the cloaking device 19. It should be appreciated that cloaking of the A-pillar P with the cloaking device 19 and removing the blind spot produced by the A-pillar P is performed without the use of metamaterials, video images, cameras, sophisticated electronics, etc.

EXAMPLE

Figure 7A:
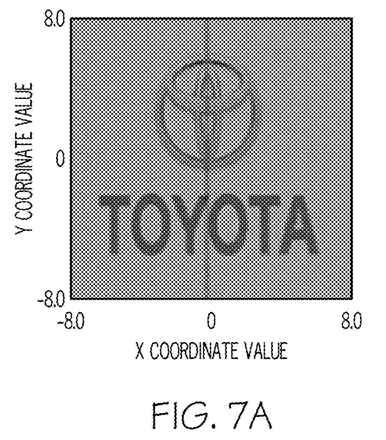
FIG. 7A depicts a computer simulated cloaking image for a cloaking assembly according to the embodiments of FIG. 2 with a 0° misalignment between a reference optical axis and a viewing angle of the cloaking assembly.
Figure 7B:
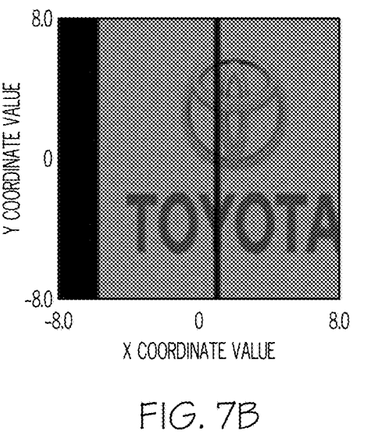
FIG. 7B depicts a computer simulated cloaking image for a cloaking assembly according to the embodiments of FIG. 2 with a 1° misalignment between a reference optical axis and a viewing angle of the cloaking assembly.
Figure 7C:
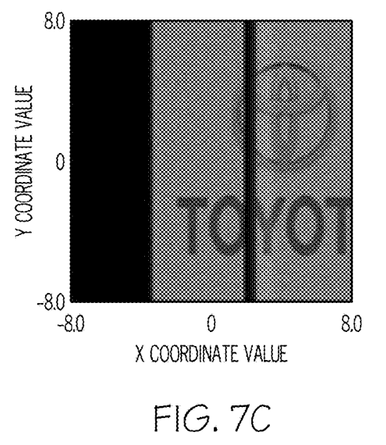
FIG. 7C depicts a computer simulated cloaking image for a cloaking assembly according to the embodiments of FIG. 2 with a 2° misalignment between a reference optical axis and a viewing angle of the cloaking assembly.
Figure 7D:
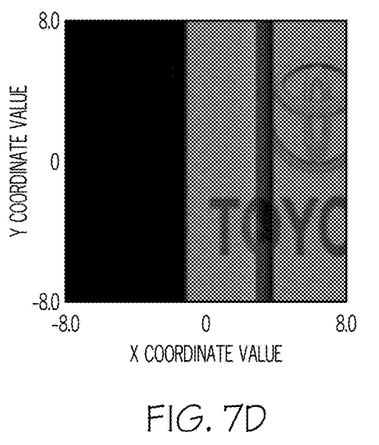
FIG. 7D depicts a computer simulated cloaking image for a cloaking assembly according to the embodiments of FIG. 2 with a 3° misalignment between a reference optical axis and a viewing angle of the cloaking assembly.
Figure 7E:
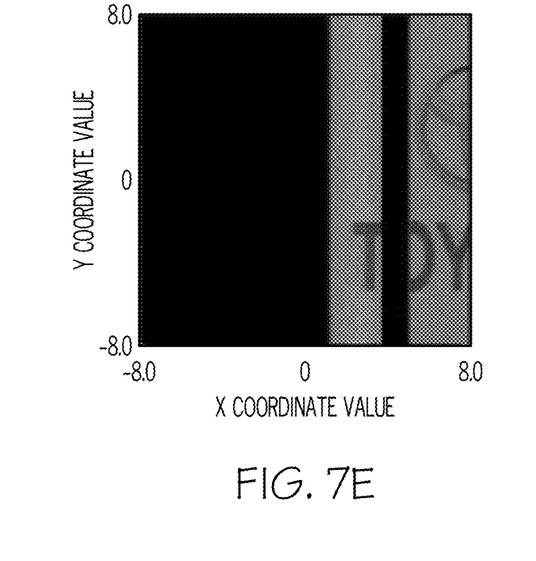
FIG. 7E depicts a computer simulated cloaking image for a cloaking assembly according to the embodiments of FIG. 2 with a 4° misalignment between a reference optical axis and a viewing angle of the cloaking assembly.
Figure 7F:
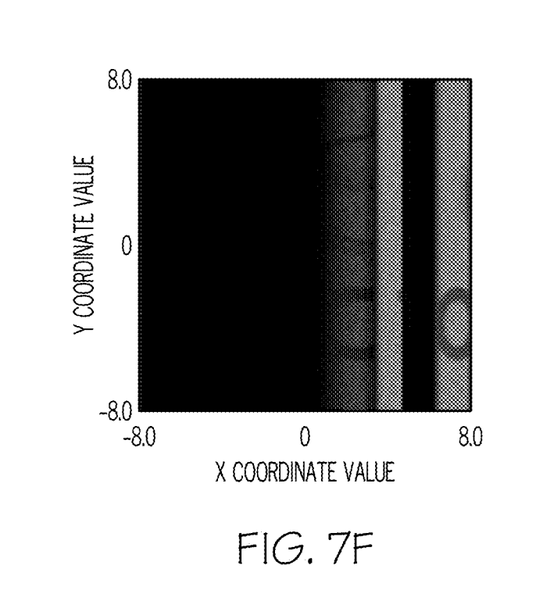
FIG. 7F depicts a computer simulated cloaking image for a cloaking assembly according to the embodiments of FIG. 2 with a 5° misalignment between a reference optical axis and a viewing angle of the cloaking assembly.

Referring now to FIGS. 7A-7F, images of an object in the form of an emblem positioned on the object-side 12 of the cloaking assembly 10 and as viewed from the image-side 14 simulated using a commercial software program (Zemax OpticStudio) are depicted. The equilateral prisms 100, 110, 120, 130, 140, 150, 160, 170, were 40 mm N-SF11 (n=1.78 at 600 nm) uncoated equilateral prisms (#65-591, Edmund Optics). The aspect ratios for the entire device area and the hidden region were 0.74 and 0.84, respectively, with a cloaking ratio (i.e., hidden area/total device area) of about 20%. FIG. 7A depicts an image of the object with no misalignment (0°) between the reference optical axis 15 and a viewing angle of the cloaking assembly 10. That is, as used herein, the term misalignment refers to an angle defined by the reference optical axis of a cloaking assembly and a line of sight of an observer viewing the cloaking assembly from the image side as depicted by the +Y direction in the figures (also referred to herein as a "viewing angle"). FIG. 7B depicts an image of the object with a 1° misalignment between the reference optical axis 15 and a viewing angle of the cloaking assembly 10. FIG. 7C depicts an image of the object with a 2° misalignment between the reference optical axis 15 and a viewing angle of the cloaking assembly 10. FIG. 7D depicts an image of the object with a 3° misalignment between the reference optical axis 15 and a viewing angle of the cloaking assembly 10. FIG. 7E depicts an image of the object with a 4° misalignment between the reference optical axis 15 and a viewing angle of the cloaking assembly 10. FIG. 7F depicts an image of the object with a 5° misalignment between the reference optical axis 15 and a viewing angle of the cloaking assembly 10. As shown by the images in FIGS. 7A-7F, an image of the object on the object-side 12 of the cloaking assembly 10 can be seen clearly with up to 2° of misalignment and is still visible with up to 3° of misalignment. Accordingly, an observer can view or "see" the object O through the cloaked region CR even if the observer is not looking directly along the reference optical axis 15 of the cloaking assembly 10.

The cloaking devices described herein may be used to cloak vehicle articles such as a vehicle A-pillar, B-pillar, C-pillar, D-pillar, etc., and remove a "blind spot" caused by the vehicle article. It will be understood that the term "blind spot" as used herein refers to an area around the vehicle that cannot be directly observed by a driver while operating the vehicle. The terms "object," "article," and "item" may interchangeably refer to a visual object or image (2D or 3D) that reflects light or transmits light and the term "light from" may refer to "light reflected from" or "light transmitted from." The terms "generally" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
    an object-side, an image-side and a cloaked region;
    a plurality of prisms positioned around the cloaked region, wherein each of the plurality of prisms comprises a light entrance side and a light exit side, the light entrance side and the light exit side defining a vertex angle there between, and a vertex formed by an intersection of a plane defined by the light entrance side and a plane defined by the light exit side, the plurality of prisms comprising:
    a first object-side prism with an inward facing vertex proximal to the cloaked region and a second object-side prism with an outward facing vertex distal to the cloaked region, wherein the vertex angle of the first object-side prism is equal to the vertex angle of the second object-side prism;
    a first image-side prism with an outward facing vertex distal to the cloaked region and a second image-side prism with an inward facing vertex proximal to the cloaked region, wherein the vertex angle of the first image-side prism is equal to the vertex angle of the second image-side prism;
    wherein:
        the light entrance side of the first object-side prism is oriented parallel to the light exit side of the second object-side prism and the light exit side of the first object-side prism is oriented parallel to the light entrance side of the second object-side prism;
        the light entrance side of the first image-side prism is oriented parallel to the light exit side of the second image-side prism and the light exit side of the first image-side prism is oriented parallel to the light entrance side of the second image-side prism;
        light from an object positioned on the object-side of the cloaking device and obscured by the cloaked region from the image-side is redirected around the cloaked region via propagation of the light through the first object-side prism to the second object-side prism, through the second object-side prism to the first image-side prism, through the first image-side prism to the second image-side prism, and through the second image-side prism forming an image of the object on the image-side of the cloaking device such that the light from the object appears to pass through the cloaked region.

2. The cloaking device of claim 1, wherein the vertex angles of the first object-side prism and the second object-side prism are equal to the vertex angles of the first image-side prism and the second image-side prism.

3. The cloaking device of claim 1, wherein the vertex angles of the first object-side prism and the second object-side prism are not equal to the vertex angles of the first image-side prism and the second image-side prism.

4. The cloaking device of claim 1, wherein the light entrance side of the second object-side prism is spaced apart from the light exit side of the first object-side prism.

5. The cloaking device of claim 1, wherein the light entrance side of the second image-side prism is spaced apart from the light exit side of the first image-side prism.

6. The cloaking device of claim 1, wherein light from the object on the object-side propagates to the image-side to form the image via the optical path:
    object to light entrance side of the first object-side prism;
    light entrance side to the light exit side within the first object-side prism;
    light exit side of the first object-side prism through a first air gap to light entrance side of the second object-side prism;
    light entrance side to light exit side within the second object-side prism;

light exit side of the second object-side prism through a second air gap to light entrance side of the first image-side prism;
light entrance side to light exit side within the first image-side prism;
light exit side of the first image-side prism through a third air gap to light entrance side of the second image-side prism;
light entrance side to light exit side within the second image-side prism; and
light exit side of the second image-side prism to image on the image-side.

7. The cloaking device of claim 1, wherein the plurality of prisms is a plurality of isosceles prisms.

8. The cloaking device of claim 1, wherein the plurality of prisms is a plurality of equilateral prisms.

9. A cloaking device assembly comprising:
an object-side, an image-side, a cloaked region, a cloaked article positioned within the cloaked region, and a reference optical axis extending from the object-side to the image-side;
a plurality of prisms positioned around the cloaked region, wherein each of the plurality of prisms comprises a light entrance side and a light exit side, the light entrance side and the light exit side defining a vertex angle there between, and a vertex formed from an intersection of a plane defined by the light entrance side and a plane defined by the light exit side, the plurality of prisms comprising:
a pair of first object-side prisms and a pair of second object-side prisms, each of the pair of first object-side prisms comprising an inward facing vertex proximal to the cloaked region and each of the pair of second object-side prisms comprising an outward facing vertex distal to the cloaked region, wherein one of the pair of first object-side prisms and one of the pair of second object-side prisms are positioned on one side of the reference optical axis and another of the pair of first object-side prisms and another of the pair of second object-side prisms are positioned on another side of the reference optical axis;
a pair of first image-side prisms and a pair of second image-side prisms, each of the pair of first image-side prisms comprising an outward facing vertex distal to the cloaked region and each of the pair of second image-side prisms comprising an inward facing vertex proximal to the cloaked region, wherein one of the pair of first image-side prisms and one of the pair of second image-side prisms are positioned on one side of the reference optical axis and another of the pair of first image-side prisms and another of the pair of second image-side prisms are positioned on another side of the reference optical axis;
wherein:
each of the light entrance sides and light exit sides of the pair of first object-side prisms is parallel to the light exit sides and light entrance sides, respectively, of the pair of second object-side prisms;
each of the light entrance sides and light exit sides of the pair of first image-side prisms is parallel to the light exit sides and light entrance sides, respectively, of the pair of second image-side prisms;
light from an object positioned on the object-side of the cloaking device assembly and obscured by the cloaked region from the image-side is redirected around the cloaked region via propagation of the light through the pair of first object-side prisms to the pair of second object-side prisms, through the pair of second object-side prisms to the pair of first image-side prisms, through the pair of first image-side prisms to the pair of second image-side prisms, and through the pair of second image-side prisms forming an image of the object on the image-side of the cloaking device assembly such that the light from the object appears to pass through the cloaked region.

10. The cloaking device assembly of claim 9, wherein each of the light entrance sides of the pair of second object-side prisms is spaced apart from the light exit sides of the pair of first object-side prisms.

11. The cloaking device assembly of claim 9, wherein each of the light entrance sides of the pair of second image-side prisms is spaced apart from the light exit sides of the pair of first image-side prisms.

12. The cloaking device assembly of claim 9, wherein the pair of first object-side prisms refract incident light from the object positioned on the object-side to the pair of second object-side prisms, the pair of second object-side prisms refract incident light from the pair of first object-side prisms to the pair of first image-side prisms, the pair of first image-side prisms refract incident light from the pair of second object-side prisms to the pair of second image-side prisms, and the pair of second image-side prisms refract incident light from the pair of first image-side prisms forming the image of the object on the image-side.

13. The cloaking device assembly of claim 9, wherein light from the object on the object-side propagates to the image-side to form the image via optical paths:
object to light entrance sides of the pair of first object-side prisms;
light entrance side to light exit sides within the pair of first object-side prisms;
light exit sides of the pair of first object-side prisms through a first pair of air gaps to light entrance sides of the pair of second object-side prisms;
light entrance side to light exit sides within the pair of second object-side prisms;
light exit sides of the pair of second object-side prisms through a second pair of air gaps to light entrance sides of the pair of first image-side prisms;
light entrance sides to the light exit sides within the pair of first image-side prisms;
light exit sides of the pair of first image-side prisms through a third pair of air gaps to the light entrance sides of the pair of second image-side prisms;
light entrance sides to light exit sides within the pair of second image-side prisms; and
light exit sides of the pair of second image-side prisms to image on the image-side.

14. The cloaking device assembly of claim 9, wherein each of the plurality of prisms is a plurality of isosceles prisms.

15. The cloaking device assembly of claim 9, wherein the plurality of prisms is a plurality of equilateral prisms.

16. A vehicle comprising:
an A-pillar; and
a cloaking device positioned on the A-pillar, the cloaking device comprising:
an object-side, an image-side, a cloaked region and a reference optical axis extending from the object-side to the image-side, wherein the A-pillar is positioned within the cloaked region, the object-side is positioned on an exterior of the vehicle and the image-side is positioned within an interior of the vehicle;

a plurality of prisms positioned around the cloaked region, wherein each of the plurality of prisms comprises a light entrance side and a light exit side, the light entrance side and the light exit side defining a vertex angle there between, and a vertex formed from an intersection of a plane defined by the light entrance side and a plane defined by the light exit side, the plurality of prisms comprising:

a first object-side prism with an inward facing vertex proximal to the cloaked region and a second object-side prism with an outward facing vertex distal to the cloaked region, wherein the vertex angle of the first object-side prism is equal to the vertex angle of the second object-side prism;

a first image-side prism with an outward facing vertex and a second image-side prism with an inward facing vertex, wherein the vertex angle of the first image-side prism is equal to the vertex angle of the second image-side prism; wherein:

the light exit side of the first object-side prism is parallel to the light entrance side of the second object-side prism;

the light exit side of the first image-side prism is parallel to the light entrance side of the second image-side prism;

light from an object positioned on the object-side of the cloaking device and pillar assembly that is cloaked and obscured by the A-pillar is redirected around the A-pillar via propagation of the light through the first object-side prism to the second object-side prism, through the second object-side prism to the first image-side prism, through the first image-side prism to the second image-side prism, and through the second image-side prism to form an image of the object on the image-side of the cloaking device such that the light from the object appears to pass through the A-pillar.

17. The vehicle of claim 16, wherein the light entrance side of the second object-side prism is spaced apart from the light exit side of the first object-side prism and the light entrance side of the second image-side prism is spaced apart from the light exit side of the first image-side prism.

18. The vehicle of claim 16, wherein the first object-side prism refracts incident light from an object positioned outside the vehicle to the second object-side prism, the second object-side prism refracts incident light from the first object-side prism to the first image-side prism, the first image-side prism refracts incident light from the second object-side prism to the second image-side prism, and the second image-side prism refracts incident light from the first image-side prism to form the image of the object within the interior of the vehicle.

19. The vehicle of claim 16, wherein the light entrance side of the second object-side prism is spaced apart from the light exit side of the first object-side prism and the light entrance side of the second image-side prism is spaced apart from the light exit side of the first image-side prism.

20. The vehicle of claim 16, wherein:
the light entrance side and the light exit side of the first object-side prism are parallel to the light exit side and the light entrance side, respectively, of the second object-side prism;
the light entrance side and the light exit side of the first image-side prism are parallel to the light exit side and the light entrance side, respectively, of the second image-side prism.

* * * * *

UNITED STATES PATENT AND TRADEMARK OFFICE
CERTIFICATE OF CORRECTION

PATENT NO. : 10,444,480 B2
APPLICATION NO. : 15/668217
DATED : October 15, 2019
INVENTOR(S) : Kyu-Tae Lee and Debasish Banerjee Page 1 of 1

It is certified that error appears in the above-identified patent and that said Letters Patent is hereby corrected as shown below:

In the Specification

In Column 5, Line 31, delete "angle θ" and insert --angle β--, therefor.
In Column 5, Line 52, delete "angle θ" and insert --angle β--, therefor.
In Column 5, Line 54, delete "angle θ" and insert --angle β--, therefor.
In Column 6, Line 34, delete "Object 0" and insert --Object O--, therefor.

Signed and Sealed this
Twenty-fourth Day of December, 2019

Andrei Iancu
*Director of the United States Patent and Trademark Office*